United States Patent [19]

Gapshis et al.

[11] Patent Number: 4,947,557
[45] Date of Patent: Aug. 14, 1990

[54] COORDINATE MEASURING MACHINE

[75] Inventors: Vladas-Algis A. Gapshis, Vilnjus; Kyastutis P. Dzidolikas, Kaunas; Juozas-Stasis Kumetaitis; Albinas J. Kasparaitis, both of Vilnjus, all of U.S.S.R.

[73] Assignee: Vilnussky Filial Experimentalnogo Nauchno-Issledovatelskogo Instituta, Vilnjus, U.S.S.R.

[21] Appl. No.: 299,830
[22] PCT Filed: May 10, 1988
[86] PCT No.: PCT/SU88/00107
§ 371 Date: Jan. 4, 1989
§ 102(e) Date: Jan. 4, 1989
[87] PCT Pub. No.: WO88/08955
PCT Pub. Date: Nov. 17, 1988

[30] Foreign Application Priority Data

Dec. 5, 1987 [SU] U.S.S.R. ............... 4242410

[51] Int. Cl.$^5$ .............................................. G01B 7/03
[52] U.S. Cl. ..................................... 33/503; 33/1 M
[58] Field of Search ............... 33/502, 503, 1 M, 504, 33/505, 556

[56] References Cited

U.S. PATENT DOCUMENTS

| 3,293,651 | 12/1966 | Gerber et al. | 33/1 M |
|---|---|---|---|
| 4,175,327 | 11/1979 | Herzog | 33/503 |
| 4,305,207 | 12/1981 | Lantz | 33/503 |
| 4,466,195 | 8/1984 | Herzog | 33/503 |
| 4,594,791 | 6/1986 | Brandstetter | 33/503 |
| 4,610,089 | 9/1986 | Bell et al. | 33/503 |
| 4,682,418 | 7/1987 | Tuss et al. | 33/503 |
| 4,777,818 | 10/1988 | McMurtry | 33/503 |

FOREIGN PATENT DOCUMENTS

| 0194002 | 9/1987 | European Pat. Off. |
| 621955 | 1/1978 | U.S.S.R. |
| 2099151 | 12/1982 | United Kingdom |

OTHER PUBLICATIONS

Stenzel Apollo Prospectus, Warner & Swasey/A. Cross & Trecker Co., Sheffield Measurement Division.
Article Ferrant, Metrology Systems (3 pages).

Primary Examiner—William A. Cuchlinski, Jr.
Assistant Examiner—Christopher W. Fulton
Attorney, Agent, or Firm—Ladas & Parry

[57] ABSTRACT

A coordinate measuring machine comprises a base (1), a portal (3), a rigid cross member (13) associated with posts (4, 5) of the portal (3), a mechanisms (14) for placement of the portal (3) interacting with the member (13), a measuring system of displacement of the portal (3), having a measurement scale (8) and a measuring head (10) coupled with the member (13), and a post 7 for arrangement of the measuring system of displacement of the portal (3), mounted on the base (1) equidistant from the posts (4, 5) of the portal (3). The post (7) carries the scale (8) in a manner that the straight line, which is the extension of the longitudinal axis of the scale (8), crosses the measurement zone embraced by the portal (3).

14 Claims, 2 Drawing Sheets

COORDINATE MEASURING MACHINE

FIELD OF THE INVENTION

The invention relates to means for angular and linear measurements, and more specifically is concerned with coordinate measuring machines.

STATE OF THE ART

Known in the art are coordinate measuring machines, comprising a base, a portal which is free to displace relative to the base, and a carriage mounted on the portal with the possibility of moving along the latter. The carriage encloses a spindle, which is free to move in a vertical plane, and the spindle carries a system of feeler gauges to feel the item being measured in the process of measurement of its geometric parameters. The portal is driven by a relevant actuating mechanism. The machine also includes a portal displacement measuring system located outside the portal on a side surface of the base. The portal actuating mechanism is arranged close to the measuring system, also outside the portal (cf., prospectus Ferranti, "The Name that Ensures Success", Methodology Systems, SC, 0657/027/3M).

Also known is a coordinate measuring machine, comprising a base with guides for a portal to move along, the portal embracing a measurement zone in which the item is placed for its geometric parameters to be measured. The portal carries a carriage which is free to move along the latter, and the carriage is provided with a spindle fitted with a system of feeler gauges and displacing in a vertical plane. The portal actuating mechanism, e.g. in the form of a lead screw and a nut, interacts with a rigid cross member connecting the lower parts of the portal posts. The machine has a portal displacement measuring system, comprising a measurement scale secured on the base and a measuring head, e.g. in the form of a set photosensors, mounted on the rigid cross member (cf., SU, A, 621,955).

The rigid cross member and the portal form a closed system.

Both prior art coordinate measuring machines do not assure the requisite accuracy and effectiveness of measurements, as the portal displacement measuring system is located at a considerable distance from the measurement zone and its tentative geometric center, and the portal actuating mechanism is comparatively far from the center of gravity of the portal proper. The foregoing factors cause additional measurement errors due to irregular angular oscillations of the portal arising during its motion, and also angular deviation of the portal. Therefore, the latter is displaced at a low rate which, in addition, must be kept constant, particularly when the feeler gauges approach the surface being measured and when the coordinates are read at the measurement points. The above circumstances result in a lower measuring capacity.

SUMMARY OF THE INVENTION

The invention essentially aims at providing a coordinate measuring machine, wherein the measurement error due to angular oscillations and angular deviation of the portal during its displacement would be reduced by altering the location of the portal displacement measuring system.

This object is accomplished by a coordinate measuring machine, comprising a base, a portal displacing along guides located on the base, and embracing the measurement zone, a rigid cross member associated with the portal posts, a portal actuating mechanism interacting with a rigid cross member, and a portal dispacement measuring system having a measurement scale connected with the base, and a measuring head associated with the rigid cross member, according to the invention which, has a post to arrange the portal displacement measuring system, which is mounted on the base equidistant from the portal posts and which carries the measurement scale of the portal displacement measuring system in a manner that the straight line, which is the extension of the longitudinal axis of the measurement scale, crosses the measurement zone.

It is expedient that the rigid cross member be secured in brackets attached to the posts of the portal above the post for arrangement of the portal displacement measuring system.

It is practicable that the portal actuating mechanism be located on the post for arrangement of the portal displacement measuring system close to the measurement scale thereof.

The straight line along which the portal displacement effort is produced with the aid of the relevant actuating mechanism may be located in a vertical plane passing through the center of gravity of the portal proper and parallel to the direction of the portal displacement relative to the base.

It has proved advantageous that the coordinate measuring machine be provided with rods interconnected by another rigid cross member carrying the measuring head, each secured on the suitable post parallel to the base and passing through the appropriate post and bracket.

It is desirable that the rods be made of a material whose thermal expansion coefficient would rule out displacement of the measuring head relative to a transverse beam of the portal.

The rods may also be enclosed in a hest-insulating jacket.

It is expedient that the portal actuating mechanism be coupled with the first rigid cross member.

The foregoing design arrangement of the coordinate measuring machine allows the accuracy and effectiveness of measurement to be improved.

BRIEF DESCRIPTION OF THE DRAWINGS

The invention will now be described in grester detail with reference to a specific embodiment thereof taken in conjunction with the accompanying drawings, wherein.

BEST MODE OF CARRYING OUT THE INVENTION

Figure 1:
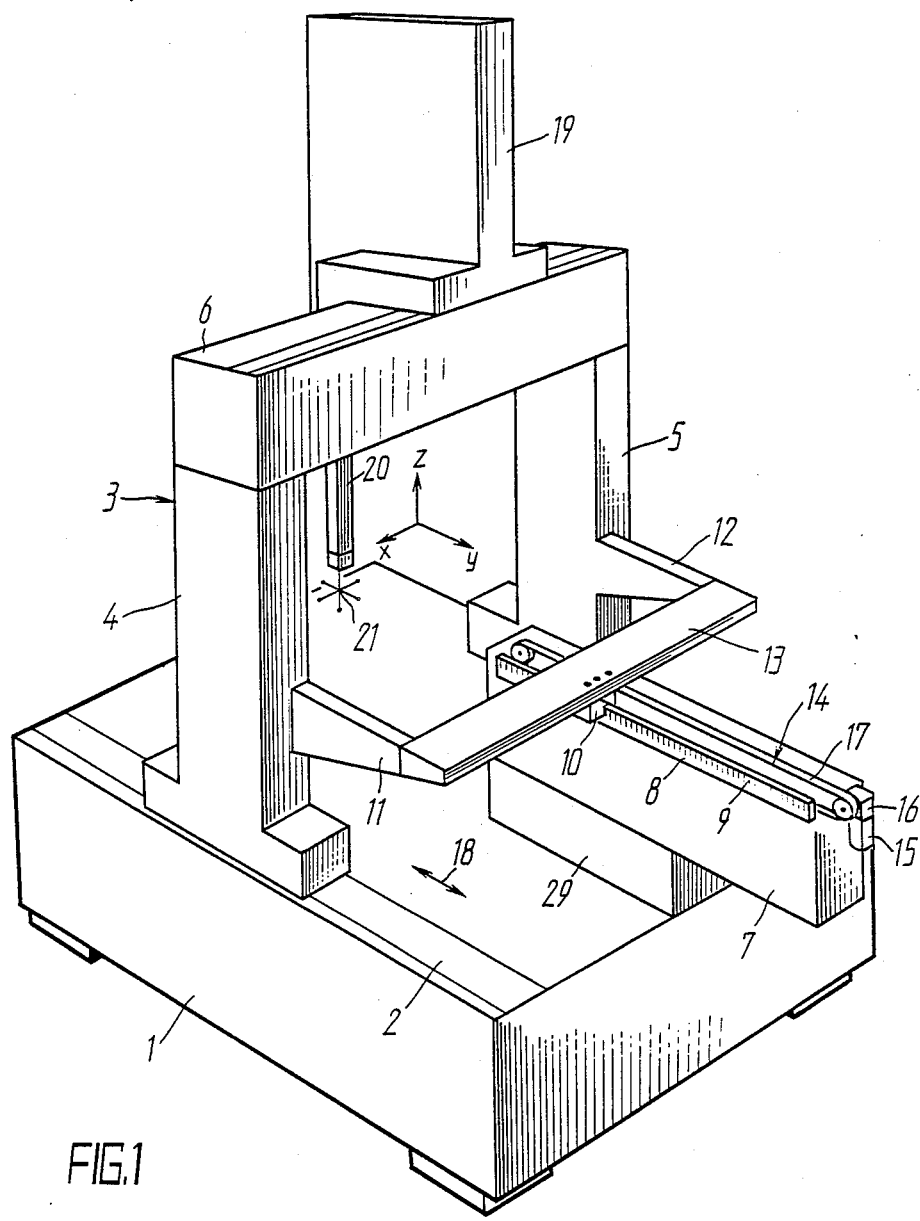
FIG. 1 illustrates the general view of a coordinate measuring machine, according to the invention.

The coordinate measuring machine comprises a base 1 (FIG. 1) carrying guides 2 for a portal 3 to move along the base 1, the portal 3 having posts 4 and 5 and a cross beam 6 and embracing the measurement zone in which the item to be measured is placed (omitted in the drawing).

A post 7 for the arrangement of a measuring system of displacement of the portal 3 is located on the base 1 equidistant from the posts 4 and 5 of the portal 3. The measuring system includes a measurement scale 8 with divisions 9, and a measuring head 10 using any operating principle known in the art, e.g. optoelectric or induction. The measurement scale 8 is secured on the upper part of the post 7 in a manner that the straight line, which is the extension of the longitudinal axis of the scale 8, crosses the measurement zone.

Secured on the posts 4 and 5 of the portal 3 are brackets 11 and 12 with a rigid cross member 13 attached thereto, the member 13 being positioned above the post 7 and carrying the measuring head 10 in a manner that the latter interacts with the scale 8.

Installed on the post 7 close to the scale 8 is a mechanism 14 for actuating the portal 3, comprising a motor 15, a reduction gear 16 and a belt drive 17 interacting with the member 13. The mechanism 14 produces an effort to displace the portal 3, which is imparted to the latter through the belt drive 17, the member 13 and the brackets 11 and 12, the straight line along which the effort is built up being in a vertical plane passing through the center of gravity of the portal 3 (which, with the portal 3 located symmetrically with the vertical axis, is below the beam 6, equidistant between its posts 4 and 5) and parallel to the direction of movement of the portal 3 relative to the base 1 indicated by an arrow 18.

A carriage 19 moving along the beam 6 of the portal 3 incorporates a spindle 20 moving along the carriage up and down and carrying a system of feeler gauges 21 to feel the item being measured in the process of measurement of its geometric parameters.

Figure 2:
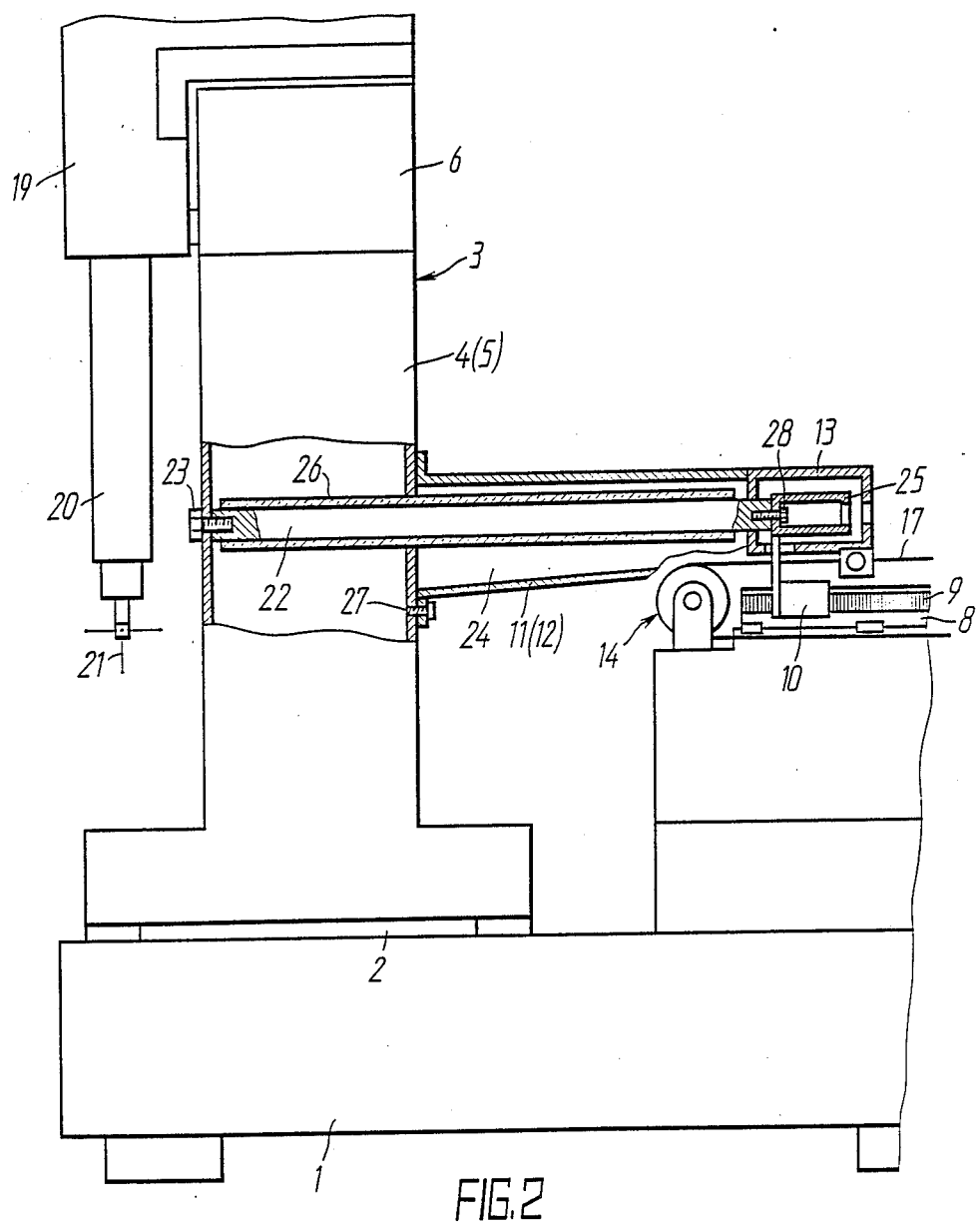
FIG. 2 shows the same machine, section along the portal post.

FIG. 2 shows another embodiment of the machine, wherein each post 4 and 5 has a hole and each hole encloses a rod 22 secured on a suitable post 4 (5) with fasteners 23. The rod 22 protrudes beyond the posts 4 (5) and passes through a plane 24 of the appropriate bracket 11 (12). The free ends of the rods 22 mount a second rigid cross member 25 connecting the rods 22. The member 25 carries the measuring head 10 of the measuring system of displacement of the portal 3.

The rods 22 are made of a material with the thermal expansion coefficient thereof precluding movement of the measuring head 10 relative to the transverse beam 6 of the portal 3. If the posts 4 and 5 of the portal 3 are made of steel, the rods 22 are preferable of quartz glass or ceramic, the thermal expansion coefficient of the material of the rods 22 being smaller than that of the material of the posts 4 and 5 of the portal 3, as a result, variation of the temperature of the environment of the posts 4 and 5 does not cause elongation of the rods 22, and the head 10 remains fixed, thus precluding an influence of this variation of the temperature of the portal 3 upon the measurement accuracy.

This purpose may also be served by providing the rods 22 with a jacket 26 made of a heat-insulating material, e.g. plastic.

Besides, the belt drive 17 of the mechanism 14 for displacement of the portal 3 is associated with the first rigid cross member 13, which also adds to the accuracy of measurement through precluding deformation of the member 25 coupled with the measuring head 10.

The brackets 11 (12) are fastened to the suitable post 4 (5) with the aid of bolts 27, and the member 25 is secured to the rod 22 by means of a bolt 28.

The coordinate measuring machine illustrated in FIG. 1 operates as follows.

The mechanism 14 displaces the portal 3 through the member 13 and the brackets 11 and 12 in the direction of the measurement zone (along the axis Y of the coordinate system) on the guides 2 relative to the base 1. Displacement of the portal 3 is measured by the head 10 moving along the scale 8. The carriage 19 moves relative to the portal 3 along the axis X of the coordinate system, and the spindle 20 with a system of the feeler gauges 21 moves along the axis Z of the coordinate system relative to the carriage 19, the gauges touching the preassigned points on the surface of the item being measured. Joint displacement of the portal 3, the carriage 19 and the spindle 20 help determine the coordinates of the preassigned points on the surface of the item, on the basis of which the geometric parameters of the item are established by any method known in the art.

Although the post 7 is located outside the measurement zone, it is arranged in a manner that the measurement system of displacement of the portal 3, associated with the post 7, is at a minimal distance from the measurement zone, which ensures minimal possible deviation from the Abbe principle (in conformity with which the distance between the measuring system and the item being measured must be minimal in order to enhance measurement accuracy). As a consequence, the measurement error due to angular misalignment of the moving portal 3 is reduced.

The height of the post 7 (FIG. 1) is adjusted by a compensating member 29, which moves under the post 7 on the base 1, which allows the scale 8 to be oriented relative to the measurement zone with different heights of the items.

Arranging the mechanism 14 on the post 7 reduces the moment of inertia of the portal 3, and its displacement owing to this is possible without angular oscillations and at a higher rate, especially when approaching the surface being measured and when reading the coordinates of the points assigned on the surface of the item. This enhances the effectiveness of the entire measurement process.

The design of the foregoing coordinate measuring machine makes it possible to improve the accuracy and effectiveness of the measurement process.

INDUSTRIAL APPLICABILITY

The invention may be used for measuring linear and angular dimensions, deviations in the shape and mutual arrangement of intricately shaped parts, e.g. bodies, posts, shafts, flanges, gear wheels and other similar parts in the power engineering, automotive, machine tool and other industries.

We claim:

1. A coordinate measuring machine, comprising a base (1), a portal (3) displacing along guides (2) located on the base (1) and embracing the measurement zone, a rigid cross member (13) associated with posts (4, 5) of the portal 3, a mechanism (14) for actuating the portal (3), interacting with the rigid cross member (13), and a measuring system for displacement of the portal (3), having a measurement scale (8) connected with the base (1), and a measuring head (10) associated with the rigid cross member (13), characterized in that it has a post (7) to arrange the measuring system of displacement of the portal (3), which is mounted on the base (1) equidistant from the posts (4, 5) of the portal (3) and which carries the measurement scale (8) of the measuring system of displacement of the portal (3) in a manner that the straight line, which is the extension of the longitudinal axis of the measurement scale (8), crosses the measurement zone.

2. A coordinate measuring machine as claimed in claim 1, characterized in that the rigid cross member (13) is secured in brackets (11, 12) attached to the posts (4, 5) of the portal (3) above the post (7) for arrangement of the measuring system of displacement of the portal (3).

3. A coordinate measuring machine as claimed in claim 1, characterized in that the mechanism (14) to actuate the portal (3) is located on the post (7) for arrangement of the measuring system of displacement of the portal (3) close to the measurement scale (8) thereof.

4. A coordinate measuring machine as claimed in claim 3, characterized in that the straight line along which the effort of displacement of the portal (3) is produced with the aid of the mechanism (14) for its displacement is in a vertical plane passing through the center of gravity of the portal (3) proper and parallel to the direction of displacement of the portal (3) relative to the base (1).

5. A coordinate measuring machine as claimed in claim 2, characterized in that it has rods (22) interconnected by another rigid member (25) carrying the measuring head (10), each secured on the suitable post (4, 5) parallel to the base (1) and passing through the appropriate post (4, 5) and the bracket (11, 12).

6. A coordinate measuring machine as claimed in claim 3, characterized in that it has rods (22) interconnected by another rigid member (25) carrying the measuring head (10), each secured on the suitable post (4, 5) parallel to the base (1) and passing through the appropriate post (4, 5) and the bracket (11, 12).

7. A coordinate measuring machine as claimed in claim 5, characterized in that the rods (22) are made of a material whose thermal expansion coefficient rules out displacement of the measuring head (10) relative to a transverse beam (6) of the portal (3).

8. A coordinate measuring machine as claimed in claim 6, characterized in that the rods (22) are made of a material whose thermal expansion coefficient rules out displacement of the measuring head (10) relative to the transverse beam (6) of the portal (3).

9. A coordinate measuring machine as claimed in claim 5, characterized in that the rods (22) are enclosed in a heat-insulating jacket (26).

10. A coordinate measuring machine as claimed in claim 6, characterized in that the rods (22) are enclosed in the heat-insulating jacket (26).

11. A coordinate measuring machine as claimed in claim 3, characterized in that the mechanism (14) for displacement of the portal (3) is coupled with the first rigid member (13).

12. A coordinate measuring machine as claimed in claim 5, characterized in that the mechanism (14) for displacement of portal (3) is coupled with the first rigid member (13).

13. A coordinate measuring machine as claimed in claim 7, characterized in that the mechanism (14) for displacement the portal (3) is coupled with the first rigid member (13).

14. A coordinate measuring machine as claimed in claim 9, characterized in that the mechanism (14) for displacement of the portal (3) is coupled with the first rigid member (13).

* * * * *

UNITED STATES PATENT AND TRADEMARK OFFICE
CERTIFICATE OF CORRECTION

PATENT NO. : 4,947,557
DATED : AUGUST 14, 1990
INVENTOR(S) : Vladis-Algis A. GAPSHIS ET AL It is certified that error appears in the above-identified patent and that said Letters Patent is hereby corrected as shown below:

Title page, Item [73] Assignee: Please delete "Vilnussky Filial Experimentalnogo Nauchno-Issledovatelskogo Instituta" and replace -- Vilnussky Filial Experimentalnogo Nauchno-Issledovatelskogo Instituta Metallorezhuschikh Stankov (ENIMS) --

Title page, Item [30] Foreign Application Priority Data, please delete "December 5, 1987" and replace -- May 12, 1987 --

Signed and Sealed this

Third Day of March, 1992

Attest:

HARRY F. MANBECK, JR.

*Attesting Officer*     *Commissioner of Patents and Trademarks*